SWITCHING CIRCUIT, OF A TYPE EMPLOYING A FOUR-LAYER SOLID STATE SWITCHING DEVICE
Filed May 9, 1966
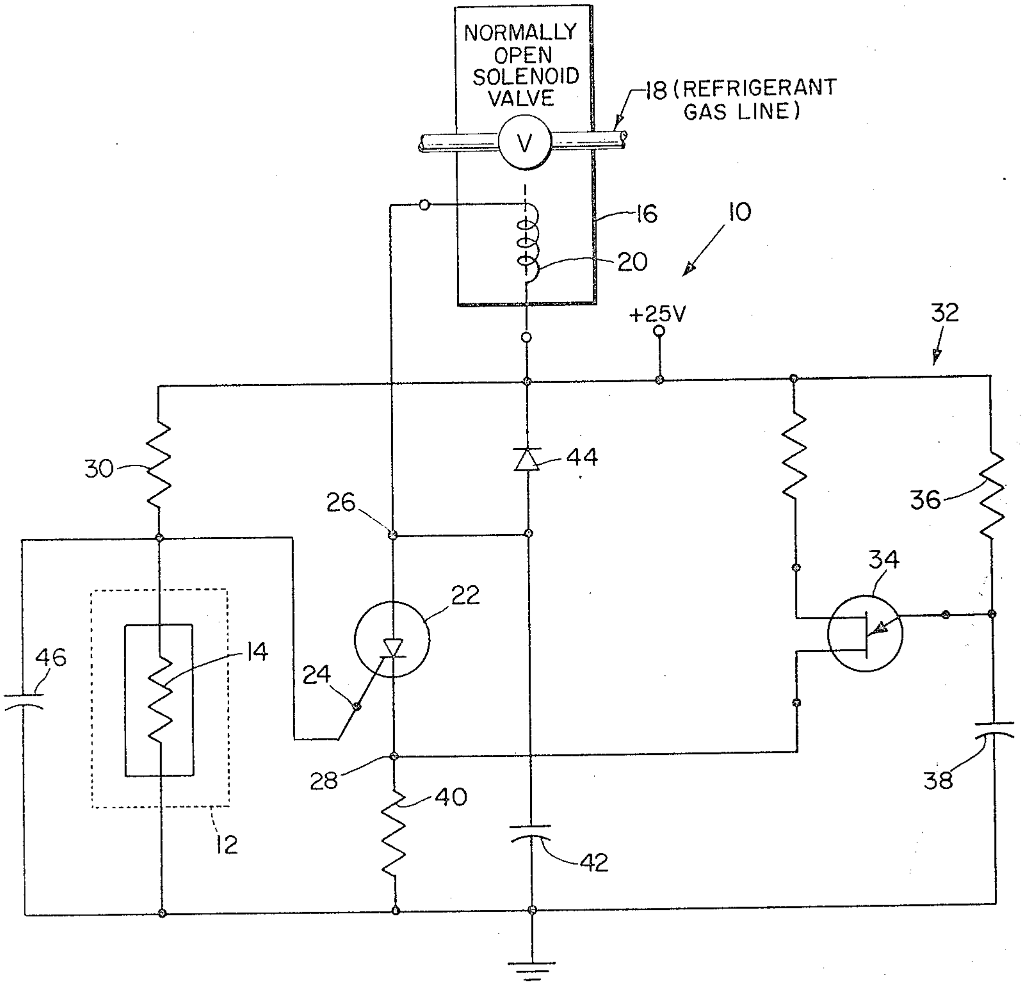
INVENTOR.
WALTER E. FREITAG
BY
MICHAEL F. OGLO
ROY MILLER
ATTORNEYS.

3,367,129

SWITCHING CIRCUIT, OF A TYPE EMPLOYING A FOUR-LAYER SOLID STATE SWITCHING DEVICE

Walter E. Freitag, China Lake, Calif., assignor to the United States of America as represented by the Secretary of the Navy Filed May 9, 1966, Ser. No. 548,804
3 Claims. (Cl. 62—216)

ABSTRACT OF THE DISCLOSURE

An electronic on-off switch circuit using a silicon switch semi-conductor device, characterized by application of a periodic positive turn-off spike to the cathode terminal across a parallel small valved dropping resistor and a current storage capacitor between the cathode terminal and ground.

The invention described herein may be manufactured and used by or for the Government of the United States of America for governmental purposes without the payment of any royalties thereon or therefor.

This invention relates to a solid-state device high current gain switch circuit of the type responsive to a gate firing voltage, and more particularly to such a circuit utilizing a so-called four-layer solid state switching device, and having special utility in conjunction with a cryostat cooled infrared detection cell having a built-in thermostat sensing element.

An object of the invention is to provide a solid-state device switch circuit which is responsive to a gold doped germanium variable impedance element, and which operates from a single direct current operating voltage supply.

Another object is to provide a circuit in accordance with the previous objective, which operates in a manner that does not radiate undesired transient signal noises.

Other objects and many of the attendant advantages of this invention will be readily appreciated as the same becomes better understood by reference to the following detailed description when considered in connection with the accompanying drawing wherein:

The single figure is an electrical schematic of the circuit forming the subject of the invention.

Referring now to the drawing, circuit 10 is a high current gain switch circuit, which may be used in conjunction with a thermostatic control system for a cryogenic device, such as is disclosed in the application of E. W. Petersen et al., entitled "Joule-Thomson Cryostat Cooled Infrared Cell Having Built-in Thermostat Sensing Element," Serial No. 548,797, filed concurrently with this application. The system disclosed in that application includes an infrared sensing device symbolically represented by dashed line box 12, having a built-in thermostat control sensor consisting of a temperature sensitive variable impedance element 14 made of gold doped germanium. Included in the system is a normally open solenoid valve unit 16 for controlling the flow of gas through a refrigerant gas supply tube 18 connected to a Joule-Thomson type cryostat, not shown, also a built-in component of sensing device 12. Variable impedance element 14 operates in cryogenic temperature regions, near the temperature of liquid nitrogen (−196° C.) with a predetermined negative temperature coefficient. Circuit 10 interrupts the flow of current through the control winding 20 of valve 16 when the temperature of the cooled zone of the infrared sensor device drops below a predetermined turn-off threshold value, and again resumes the flow of refrigerant gas when the temperature rises to a predetermined turn-on threshold value.

Circuit 10 comprises a four layer voltage controlled type solid state switch device 22 having a relatively high continuous load current capacity, of the order of 0.8 amp., such as a 2N1871A silicon controlled switch manufactured by Solid State Products, Salem, Mass. This switch device is turned on by a voltage applied to its gate terminal 24 which is higher than its predetermined gate firing potential (approximately 0.5 volt at 25° C. for the 2N1871A switch device. Once the switch is "on," it will remain in the "on" state regardless of the gate voltage. Turn off is accomplished by reducing the voltage of its anode terminal 26 to zero, or to a negative voltage relative to its cathode terminal 28, for a time exceeding the gate recovery time (typically 10 milliseconds). To remain off, the gate potential must be less than the gate firing potential.

The gate firing potential and current are supplied by a voltage divider network consisting of a bias resistor 30 and the temperature sensitive variable impedance element 14 connected across the positive operating voltage supply for the solid state circuitry and the solenoid valve of the system. The variable impedance element 14 has a negative temperature coefficient and a resistance of less than 50 ohms at room temperature, and a resistance in excess of 1K in the cryogenic temperature region. For further details of variable impedance element 14, reference is made to the above referenced concurrently filed patent application. As the temperature of the thermal sensor and detector decreases the divider ratio becomes lower, and the gate voltage increases to the gate firing potential, at which time the switch turns on. This energizes control winding 20 and shuts off flow of refrigerant gas to the cryostat in device 12.

Switch device 22 will then remain on, until turned-off by a conventional unijunction relaxation oscillator circuit 32 connected to its cathode terminal 28. Relaxation oscillator circuit 32 comprises a unijunction transistor 34 and a resistance-capacitance charging network consisting of resistor 36 and capacitor 38. Capacitor 38 will charge through resistor 36 to the intrinsic stand-off ratio of the unijunction. At this time capacitor 38 will discharge through the emitter and base-one of the unijunction, causing a positive voltage spike to appear across a small valued dropping resistor 40, connected between the cathode terminal 28 of the switch device 22 and circuit ground. The positive spike raises the cathode potential above that of the anode, which turns the switch device 22 off. The frequency of oscillation of circuit 32 is determined by the time constant of resistor 36 and capacitor 38, and the pulse duration of the positive spike by that of capacitor 38 and resistor 40. A current charging capacitor 42 is connected between anode terminal 26 of switch device 22 and ground. It is chosen to provide sufficient capacitance to enable uninterrupted flow of current through the solenoid control winding during the interval of the spike that turns switch device 22 off.

If the gate potential is below the firing potential the switch device will remain turned off at the conclusion of the spike, and the control winding 20 will be de-energized. The inductance of winding 20 will cause a transient spike to appear at the anode terminal. A diode 44 is connected across the control winding, and poled with its anode connected to the switch device anode terminal and its cathode to the positive supply, in order to provide an affective short for any voltages of this inductive spike in excess of the supply voltage.

If the gate voltage is above the gate firing potential when the relaxation oscillator spike at the switch device cathode terminal occurs, the switch device will turn on again as soon as the latter spike disappears. Because capacitor 42 provides a sufficiently long time constant charge circuit, the current through the winding 20 will not drop below the solenoid valve's dropout valve. Therefore if the switch device is on, the relaxation oscillator will have no effect on the solenoid. If the switch device is off, the relaxation oscillator device will have no effect on either the switch or the solenoid.

A smoothing capacitor 46 is preferably connected across variable impedance element 14. It has been found that this capacitor prevents instability in the turn off, or turn on, characteristic of the circuit 10.

An important feature of the invention is that the periodic operation of the relaxation oscillator does not result in exciting solenoid coil at the switch devices anode terminal, except when an actual change in the state of the switch device occurs due to use of capacitor 42. As the result, circuit 10 has very little radiated energy due to the relaxation oscillator's operation. Minimizing radiated energy is particularly important because it would interfere with the proper operation of the infrared sensor.

Obviously many modifications and variations of the present invention are possible in the light of the above teachings. It is therefore to be understood that within the scope of the appended claims the invention may be practiced otherwise than as specifically described.

What is claimed is:

1. In combination with a Joule-Thomson type cryostat cooling system including a variable impedance temperature sensing element disposed in heat transfer relationship to the cooled zone and adapted to have negative temperature coefficient in the approximate temperature region of liquid nitrogen (—196° C.), and including a high pressure refrigerant gas source controlled by a normally opened on-off solenoid valve, (a) a four layer voltage controlled solid state switch device forming an alternatively opened or closed switch path between its first and second load circuit terminals and operative to be initiated from closed to open switch path condition in response to a signal voltage at its gate terminal in excess of a predetermined gate firing potential, and operative to be initiated from open to closed switch path condition in response to pulsed reduction of the voltage across its load circuit terminals to zero and the signal voltage at the gate being less than said predetermined gate firing potential, (b) one of said first and second terminals being connected to the solid state switch device operating voltage supply through a parallel network including the solenoid valve control winding and a diode connected thereacross, said diode being poled to protect the switch device against undesired inductive voltage generated by the winding at the time the switch is initiated to its opened switch position, (c) an input circuit comprising an impedance dividing network consisting of said temperature sensing variable impedance element and a dropping impedance connected in series circuit across potential source with the circuit junction point between the variable impedance element and the dropping impedance applied to the gate of the solid state switch device, (d) circuit means coupled to the other of said load circuit terminals for periodically impressing a pulse of the same polarity as said operating voltage to the other load terminal of the switching device to reduce the voltage between the load terminals to zero, (e) the one load terminal of the switch device being connected to circuit ground through a capacitor to form a pulse energy storage circuit having a sufficiently large time constant relative to said pulse period to enable uninterrupted flow of current through the solenoid control winding during the period the voltage across the load terminals is zero.

2. Apparatus in accordance with claim 1, wherein, (f) said four layer voltage controlled type solid state switch device is a silicon controlled switch device, the one load terminal comprising its anode and connected to a positive operating potential through the parallel network, and the other load terminal comprising its cathode.

3. Apparatus in accordance with claim 1, wherein, (g) said circuit for periodically impressing a pulse comprises said other load terminal being connected to circuit ground through a second dropping resistor, and a pulse output relaxation oscillator circuit connected to the circuit junction between the other load terminal and the second dropping resistor.

References Cited

UNITED STATES PATENTS

| | | | |
|---|---|---|---|
| 3,092,977 | 6/1963 | Skinner | 62—514 XR |
| 3,293,877 | 12/1966 | Barnes | 62—514 XR |
| 3,305,000 | 2/1967 | Bullen | 62—514 XR |

MEYER PERLIN, *Primary Examiner.*